Patented Apr. 28, 1936

2,038,582

UNITED STATES PATENT OFFICE 2,038,582

PROCESS OF MAKING PECTOUS PRODUCT

Herbert T. Leo, Anaheim, Calif.

No Drawing. Application July 22, 1932, Serial No. 624,049

8 Claims. (Cl. 99—133)

This invention relates to a pectous product and to a process for making the same. More particularly, the invention relates to a process of making a fibrous, pectous product of standardized jell strength from apple pomace or from similar products derived from apples.

Although apple pomace and dried apple products have been in use commercially as a source of pectin for at least twenty years, widespread use of such products as heretofore produced has been seriously hampered because of the lack of uniformity of the effective pectin content, or jell strength of the product. While it has been proposed to dry apple pomace and extract the alcohol soluble substances therefrom to provide a dried product containing pectous material, this practice has not resulted in a final product of uniform available pectin content for a number of reasons. In the first place, such prior method has not compensated for variations in the actual available pectin content of the apple pomace due to innumerable natural causes, such as the ripeness of the fruit, the extent of the enzyme reactions, and the varying amounts of sugars, acids, salts, and other water and acid soluble substances in the natural fruit.

Another serious objection to the use of apple pomace and dried apple products as previously prepared for the utilization of their pectin content arises from the practice of most apple growers of spraying their orchards with lead arsenate or other mineral salt commonly used for insecticidal and fungicidal purposes. The method heretofore proposed of extracting dried fruit products with alcohol or other organic solvents is entirely incapable of removing arsenates and the like from apple pomace, since organic solvents in general, in the substantially anhydrous form that they have been used, will not dissolve these mineral salts. The removal of arsenate in particular from the apple pomace in the manufacture of a pectin product such as here contemplated is extremely important, since I have definitely established that apple pomace from most sources contains a greater quantity of arsenate than is permissible under the tolerances laid down by the U. S. Department of Agriculture, or other Government bureaus. The practice of spraying apple orchards with insecticidal and fungicidal preparations containing lead arsenate is so widespread and almost universal that very serious conditions would very probably arise if apple pomace, treated by the previously suggested methods, came into general use as a source of pectin supply.

There have, of course, been a number of processes developed for the isolation of pectin in a dry or liquid form from various fruit sources, including apple pomace, but such processes include expensive and relatively inefficient chemical processes, such as precipitation with alcohol, or with aluminum or ferrous salts or hydrates. As is well known, aluminum and iron salts have a tendency to shrivel and shrink colloidal substances, such as pectin, and thereby greately decrease and ampair the effective jellying power of the pectin. Further, in the case of liquid pectin solutions, it is impossible to prepare such solutions of any great strength, since aqueous solutions of pectin above, say 6%, are too viscous to be handled conveniently. Also, in the case of aqueous pectin solutions, there is always danger of fermentation and deterioration from this and other causes when kept in storage.

My present invention contemplates an improvement over previously known processes for the preparation of a pectous product from apple pomace, whereby the product is obtained substantially free from arsenates or other objectionable mineral salts and with an available pectin content of standardized jell strength. My invention also eliminates the costly chemical steps that are necessary to isolate pectin in a substantially pure dry or liquid state, since my process does not necessitate the separation of the pectose from the cellulose tissues or fibers of the fruit.

It is therefore an object of this invention to provide a simple and economical method for the preparation of a pectous product of known or standardized available pectin content, useful in the making of jams, jellies and other edible products in which pectin is generally employed.

It is a further important object of this invention to provide a pectous product of uniform or standardized jell strength that can be used in regulated or standardized formulæ for making jellies, jams, and the like, and which will insure uniform results.

Other and further important objects of this invention will become apparent from the following description and appended claims.

Apple pomace or other apple products of like nature constitutes the starting material used in my method of preparing a pectous product. While citrous fruits are also an available source of pectin, they are not suitable for use in my method and are therefore excluded from the scope of this invention.

The dried apple pomace, is first ground or pulverized by means of the usual grinding equipment suitable for the purpose, to give a very finely comminuted product. It is important to obtain a finely divided product of substantially uniform mesh in order that, upon use of the final product, the pectin may be readily available and its extraction can take place uniformly and rapidly.

The dried, finely ground pomace is then submitted to a treatment calculated to remove as much water and acid soluble substances other than pectin as possible. The solvent preferred for use in this extraction process comprises an aqueous mixture of an alcohol, such as ethyl or methyl alcohol, and an acid, such as hydrochloric acid. An ordinary anhydrous organic solvent is unsuited for the purpose, since it is incapable of dissolving sugar mineral salts and more particularly lead arsenate. Even the usual ethyl alcohol of 95% alcohol strength is entirely unsuited for my purpose. Further, while an aqueous acid solution could be used alone if it were merely desired to remove the acid and water soluble substances, its use is impractical because of the solvent action that it would exert toward the pectose or pectin content of the pomace. My purpose is to dissolve out all of the water and acid soluble substances of the pomace except the pectin and to leave that distributed in substantially its natural state within and mixed with the cellular or fibrous structure of the fruit.

A suitable solvent for this extraction step comprises the following ingredients:

35 to 60% alcohol, preferably ethyl or methyl alcohol,
0.5 to 5% equivalent hydrochloric acid (HCl)
64.5 to 35% water
(Percentages are by weight)

It will be understood that the above represents the preferred range of proportions of the extracting solvents, but that aqueous mixtures of an acid and alcohol of proportions lying outside of the above range may be used with less satisfactory results. As before stated, however, neither 95% ethyl alcohol nor an aqueous acid solution by themselves can be satisfactorily employed to accomplish the desired results.

The extraction is preferably carried out in the cold or at ordinary atmospheric temperatures. Any suitable equipment and any suitable type of extraction method may be employed. The extraction is continued until the water and acid soluble salts and other substances contained in the dried apple pomace are substantially removed, and more particularly until the arsenate content is brought considerably below the U. S. Government tolerance.

The removal of the natural sugars and salts contained in apple pomace is very important from the standpoint of securing a uniform pectous product. It will be understood that the sugar and salt content of apple pomace vary very considerably depending upon the condition of the fruit and that such variations not only affect the actual percentage of pectous substances in the pomace but also have an important effect upon the availability of the pectin in the final product. For instance, the extractibility of pectin from the final product in jelly making or like operations depends quite largely upon the acid concentrations, more technically referred to as the pH value of the solution. The presence of buffer salts, such as the soluble alkali metal salts of malic, maleic or malonic acids, or other fruit acids that may be present in the apple pomace, modifies the pH value and may change it to such an extent that the pectin cannot be efficiently utilized. After the arsenic, lead, iron, calcium and alkali metal salts and the water soluble materials such as sugars and the like have been substantially extracted from the dried apple pomace, the residual mass is rinsed as free as possible from the remaining solution and particularly from any remaining acids, and any traces of acid are neutralized to a safe limit so that no harm may be done to the pectous material upon drying. Where a strong mineral acid, such as hydrochloric acid, is used in the extracting solvent, it would be harmful to leave the residual mass after extraction appreciably on the acid side, since pectous material is easily destroyed, so far as its jellying ability is concerned, by mineral acids in the presence of heat.

In order to neutralize or render ineffective the traces of acid that may remain in the residual pomace mass, buffer salts, such as sodium bicarbonate, sodium potassium tartrate or sodium acetate, may be added to the final rinsing solution of the alcohol-water mixtures so that the pH is within a safe limit, such as between 3.0 and 4.5. The material is then dried in a suitable drier and tested for its pectin content to prepare it for standardization.

The product, after drying, is a light colored to brownish substance, depending upon the extent to which the extraction is carried. The solvent mixture of alcohol, acid and water has an extractive effect on the coloring matters of the pomace and will, if the period of extraction is extended and the quantity of extracting solvents sufficient, extract substantially all of the coloring matter from the dried pomace. The lightness of color in the final product permits its use in many manufactures from which apple pomace has previously been excluded. The dried, final product contains a substantially uniform proportion of pectose or other pectous substance admixed with and distributed through the cellular or fibrous structure. While this product could be directly utilized in the form in which it is obtained, a much more satisfactory and useful product is provided by standardizing to a predetermined jell strength. Any convenient method of standardization may be used, although I prefer substantially the following procedure:

A given weight of the dried pectose material, for example 30 grams, is added to a measured quantity of water, say 900 cc. of water, and the pH of the liquid governed by the addition of an acid, such as one of the usual fruit acids, to within a range of 2.2 to 3.4. This mixture is then heated to the boiling point and allowed to remain above 200° F. for a period of 20 to 30 minutes, but without change of volume. In the event that the pH of the resulting solution is below 3.25, a measured amount of a buffer salt is added to bring it above this value, namely to a lesser hydrogen ion concentration. This is done to prevent premature setting of the jelly in the kettle when sugar is added in the jelly making process. The liquid resulting from the cooking step is drained free from cellular products and is now tested in an actual jelly making process, as follows, to determine the strength of the dried pectous material started with.

Starting with 500 grams of sugar, in the first test, a given volume of the pectous extract prepared as above described, say 600 cc. is added and the resulting mass boiled to an exact weight, such that 65% by weight of sugar is present, or the syrup may be evaporated to a weight of 770 grams. The syrup is then removed from the fire, 4 cc. of 50% citric acid solution placed in each of a number of 8 ounce tumblers, and the hot syrup poured into the tumblers and stirred rapidly. Jelly will form quickly, but for purposes for testing for strength, the tumblers should be allowed to stand for 24 hours to permit a complete setting of the jelly. The amount of acid added to each of the tumblers brings the pH value to a safe and satisfactory figure for jell formation.

This same procedure is repeated a number of times, using successively smaller quantities of the pectous extract, for instance, 500, 400 and 300 cc. each time concentrating to the same weight of 770 grams or 65% sugar content. In this way, different samples of jelly are obtained for purposes of comparison and the minimum quantity of the pectous extract required to set the 500 grams of sugar used is determined. After turning out the jellies, any satisfactory means of judging the jellies for strength and quality may be used. The jelly corresponding to the usual commercial standard will be considered the criterion as to the amount of the pectous extract required to jell the 500 grams of sugar. By calculation from this ratio, knowing the quantity of dried pectous product to which the pectous extract is equivalent, the corresponding strength of the dry pectous product may be determined. The jell strength of the dry pectous product may then be adjusted upwardly or downwardly to the desired standard, by the addition of dry pectin or pectous material of known pectin content, or by the addition of inert materials, such as cerelose. Large batches of the dry pectose product may thus be standardized and subsequent batches adjusted to the same standard jell strength. In this way, the commercial product may be marketed as a standardized product, capable when used in a definite formula of insuring uniform results.

In the actual jelly making process, my dried pectous product will be added in the proper quantity to the fruit pulp before or during cooking and before straining, so that the fibrous and cellular matter of my product will be strained out, the same as the fibrous and cellular portions of the fruit that is being made into jelly. It is, of course, obvious, however, that the pectin may be extracted from my dried pectose product in a separate operation if so desired.

One of the important advantages of my product is that it may be prepared with an available pectin content, or jell strength, considerably above that permissible in liquid pectin preparations, thereby reducing the weight and bulk over those of equivalent quantities of pectin in liquid pectin preparations. This results in a considerable saving in transportation charges. Furthermore, my dried product is a permanently stable product because of its freedom from sugars or other substances that may ferment. Because of the availability of apple pomace at comparatively low prices and the inexpensive nature of the steps of my process, my product can be produced at a very much lower cost on an equivalent jell strength basis than can substantially pure solid or liquid pectin preparations.

My present process is to be distinguished from the process of Patent No. 1,838,949, dated December 29, 1931, of which I was one of the joint inventors, since in the process of that patent, the pectin was rendered water soluble by means of an acid digestion and the fibrous material was converted into a substantially colloidal state. According to the present process, the pectose naturally occurring in the apple pomace is not converted into a water soluble form, in the sense of being readily soluble in water, but requires the presence of an acid and the use of heat for its extraction in a complete and efficient manner. Furthermore, the fibrous material of my present pectous product is not of colloidal size but can be removed by filtering and is largely removed in the usual operation of straining the fruit juices from a cooked fruit pulp.

The effectiveness of my method in reducing the lead arsenate content of the apple pomace below the tolerance required by the Government is of particular importance, since it does not require of the fruit grower any change in present practice of spraying the apple trees. Without some method of reducing the arsenate content of the pomace, pectous products of the type herein described could not safely be made from this source.

As previously stated, the product of my invention cannot be prepared from citrus fruit pulp. While the underlying reason why citrus fruit pulp cannot be used in my process cannot be entirely explained by me, I have demonstrated the fact experimentally to my complete satisfaction. If the pulp from citrus fruit, such as lemons, is prepared in accordance with the method herein disclosed by grinding the dried pulp, extracting with an aqueous, alcoholic acid solution, rinsing and drying the resulting product, such product cannot be used with satisfactory results as a source of pectin in the making of jellies and the like. The reason for this is that most fruit juices, such as are used in jelly making, have a pH value of from 3 to 4, or thereabout, whereas the pectin contained in the pectous product derived from citrus fruit pulp cannot be extracted efficiently unless the pH of the extracting solution is approximately from 2.0 to 2.60.

I find, experimentally, that less than 5% of the actual pectin content of a pectous product derived from citrus fruit in accordance with the method herein disclosed is available when used with ordinary fruit juices for the making of jellies. The reason is, as above stated, that the ordinary fruit juices do not have a sufficiently high acid concentration, or correspondingly low pH value, to effect the extraction of the pectin from the dried citrus product during the step of cooking the fruit in the making of jellies. Whether the pectin is present in the citrus fruit product in a different form or whether there are other incompatible substances that prevent the efficient extraction of the pectin from the citrus fruit products, I have not been able to determine with certainty. It seems probable that there are certain salts, such as iron or aluminum salts naturally present in citrus fruits and that these salts retard or prevent the extraction of the pectin unless a solution of high acid concentration, namely of a pH between 2.0 and 2.60, or thereabout, is used.

On the other hand, the pectin or equivalent substance, present in the product obtained from apple pomace in accordance with my method disclosed herein, is readily extracted during the cooking of fruits in the ordinary jelly making processes, namely, where the pH value is between 3.0 and 4.0, and usually between 3.10 and 3.70. Consequently, my product prepared from apple pomace contains readily available pectin that can be efficiently utilized in the usual jelly making processes. It is simply necessary to add my pectous product derived from apple pomace directly to the fruit pulp during the cooking step, without the addition of any acid other than that naturally found in the ordinary fruits used for jelly making. The extraction of the actual pectin content of my product, proceeding in this way, is substantially 100%. This is in striking contrast with an extraction of less than 5%, following the same procedure but using a product derived from citrus fruits.

It is this characteristic of substantially complete extractibility of the pectin that renders my product capable of being standardized. In the case of a pectous product derived from citrus fruits, the degree to which the pectin would be extracted when the product is used in jelly making would be dependent upon the hydrogen ion concentration of the particular fruit used in the jelly making process, and in no case would the extraction of the pectin be even relatively complete. However, with my product, the pectin is substantially entirely extracted in any jelly making process using the ordinary fruits since all of the ordinary fruits provide solutions having a pH value suitable for complete extraction of the pectin from the apple pomace product. This factor of substantially complete extractibility of the pectin permits the pectin or jelly strength of my product to be standardized with respect to the results that can actually be obtained whatever particular fruit may be used in the jelly making process.

I am aware that numerous details of the process may be varied through a wide range without departing from the principles of this invention, and I, therefore, do not purpose limiting the patent granted hereon otherwise than necessitated by the prior art.

I claim as my invention:

1. In the process of preparing a pectous product from dried apple pomace, the step of extracting finely comminuted dried apple pomace with an aqueous alcoholic-acid solution.

2. In the process of preparing a pectous product from dried apple pomace, the step of extracting finely comminuted dried apple pomace with an aqueous solution of an alcohol and an acid in the proportions of from 0.5 to 2% by weight of hydrochloric acid or its equivalent and 35 to 60% of ethyl alcohol or its equivalent.

3. In the process of preparing a pectous product from dried apple pomace, the steps which comprise extracting substantially all of the constituents of said dried apple pomace therefrom except the pectose and fibrous matter by means of an aqueous-alcoholic-acid solution, isolating and drying the insoluble residue after extraction.

4. In the process of preparing a pectous product from dried apple pomace, the steps which comprise extracting substantially all of the constituents of said dried apple pomace therefrom except the pectose and fibrous matter by means of an aqueous-alcoholic-acid solution, isolating and drying the insoluble residue after extraction and standardizing said residue as to jellying power to give a product of predetermined jellying strength.

5. The process of preparing a pectous product, which comprises washing a finely comminuted apple pomace with a mixture of alcohol, acid and water to remove substantially all of the constituents soluble in said mixture, adjusting the acidity of the remaining fibrous mass containing pectose to give the mass a hydrogen ion concentration not higher than pH=3.0, drying said mass and standardizing the dried mass so as to have a predetermined jellying strength.

6. The process of preparing a pectous product, which comprises washing a finely comminuted apple pomace with a mixture of alcohol, acid and water having a composition of from 0.5 to 2.0% of hydrochloric acid, 35 to 60% of ethyl alcohol and the balance water, to remove substantially all of the constituents soluble in said mixture, adjusting the acidity of the remaining fibrous mass containing pectose to give the mass a hydrogen ion concentration not higher than pH=3.0, drying said mass and standardizing the dried mass so as to have a predetermined jellying strength.

7. The process of preparing a pectous product, which comprises washing a dried, finely comminuted apple pomace, with an acid aqueous alcoholic solvent for salts including lead arsenate, thereby removing lead arsenate and other salts from said pomace, removing the solvent largely from the pomace mass, adding buffer salts to the pomace mass to impart thereto a hydrogen ion concentration of between pH=3.0 and pH=4.5, drying the pomace mass and adjusting the jellying strength of said mass to a predetermined standard.

8. In the process of preparing a pectous product from dried apple pomace, the step of extracting finely comminuted dried apple pomace with an aqueous solution of an alcohol and an acid, the alcoholic content of said solution being between 35% and 60% by weight.

HERBERT T. LEO.